(12) United States Patent
Liu et al.

(10) Patent No.: US 8,737,044 B2
(45) Date of Patent: May 27, 2014

(54) MOVING MODULE AND ELECTRONIC DEVICE

(75) Inventors: Chen-Kuang Liu, Taoyuan County (TW); Yu-Min Chen, Taoyuan County (TW); Cheng-Te Chen, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 210 days.

(21) Appl. No.: 12/773,848

(22) Filed: May 5, 2010

(65) Prior Publication Data
US 2011/0063781 A1 Mar. 17, 2011

(30) Foreign Application Priority Data
Sep. 16, 2009 (TW) .............................. 98131243 A

(51) Int. Cl.
*H05K 5/00* (2006.01)
*H05K 7/00* (2006.01)
*H04M 1/00* (2006.01)

(52) U.S. Cl.
USPC ............ 361/679.01; 361/679.06; 361/679.26; 361/679.27; 361/679.29; 361/679.3; 361/679.55; 361/679.56; 455/575.1; 455/575.3; 455/575.4

(58) Field of Classification Search
USPC ............ 361/679.01, 679.02, 679.08, 679.09, 361/679.3, 679.55–679.59; 439/131; 369/282, 291, 253, 44.16, 75.5; 174/535; 29/557; 70/357, 367, 406, 70/381, 491
See application file for complete search history.

(56) References Cited

U.S. PATENT DOCUMENTS

| 7,084,345 B1 | 8/2006 | Chen et al. |
| 2005/0250563 A1 | 11/2005 | Nan |
| 2006/0046783 A1 * | 3/2006 | Bae ............................... 455/558 |
| 2006/0176654 A1 | 8/2006 | Kfoury |
| 2009/0149230 A1 * | 6/2009 | Ruan .......................... 455/575.4 |

FOREIGN PATENT DOCUMENTS

| TW | 200527879 | 8/2005 |
| TW | M278170 | 10/2005 |
| TW | M361574 | 7/2009 |

OTHER PUBLICATIONS

"1st Office Action of European Counterpart Application", issued on Sep. 7, 2010, p. 1-p. 7, in which the listed references were cited.
"Search Report of European Counterpart Application", issued on Aug. 25, 2010, p. 1-p. 4, in which the listed references were cited.
"Office Action of Taiwan Counterpart Application", issued on Jul. 20, 2011, p. 1-p. 9, in which the listed references were cited.

* cited by examiner

*Primary Examiner* — Jenny L Wagner
*Assistant Examiner* — Jerry Wu
(74) *Attorney, Agent, or Firm* — Jianq Chyun IP Office

(57) ABSTRACT

A moving module and an electronic device are provided. The electronic device includes a first body, a second body, and the moving module disposed between the first and second bodies. The moving module includes a rail, a moving element, and an elastic element. The moving element is in contact with the rail. The elastic element is connected between the moving element and the first body. When the moving element moves from a first end of the rail to a curved portion of the rail, a force exerted on the elastic element by the moving element is gradually increased. When the moving element passes the curved portion, an elastic restoration force of the elastic element drives the moving element to move toward a second end of the rail. When the moving element reaches the first end or the second end, the first body and the second body interfere with each other.

10 Claims, 6 Drawing Sheets

US 8,737,044 B2

MOVING MODULE AND ELECTRONIC DEVICE

CROSS-REFERENCE TO RELATED APPLICATION

This application claims the priority benefit of Taiwan application serial No. 98131243, filed on Sep. 16, 2009. The entirety of the above-mentioned patent application is hereby incorporated by reference herein and made a part of this specification.

BACKGROUND OF THE INVENTION

1. Field of the Invention

The present application relates to a moving module and an electronic device, and more particularly, to a thinner moving module and electronic device.

2. Description of Related Art

With the development of technology, people are more and more relying on electronic devices. Today's users are demanding the electronic devices to have higher performance and to be lighter, thinner, shorter and smaller. Various electronic devices, such as, ultra mobile personal computers (UMPC), tablet PCs, pocket PCs, personal digital assistants (PDA), cell phones and notebook PCs, have been developed accordingly.

In order to facilitate typing characters, hand-held electronic devices may be provided with a standard keyboard on its body. However, if the keyboard and the display are both disposed on one side of the same body, a body of a large size is required to accommodate the keyboard and the display. Accordingly, electronic devices having two slide bodies have been developed.

The electronic device having two slide bodies is typically provided with a moving module between the two bodies. The moving module utilizes moving elements slidable on rails and springs connected between the two bodies to enable a relative movement between the two bodies.

However, this type of moving module has some defects. Firstly, the springs occupy the space in both bodies. Therefore, it is unable to reduce the volume occupied by the moving module, which makes it impossible to reduce the thickness of the hand-held electronic device. Secondly, the springs are compressed or stretched by relative slide movement of the two bodies. Therefore, the structural relationship between the bodies and the springs needs to be considered during design and fabrication. When it is necessary to modify the driving elements of the moving module, for example, to modify the type or number of the springs, the springs and relevant structures on the two bodies inevitably need to be modified accordingly. This not only increases the complexity of fabrication of the hand-held electronic device, but the commonality in use of the moving module is also reduced.

SUMMARY OF THE INVENTION

Accordingly, the present application is directed to a moving module which has improved commonality and flexibility in fabrication and use.

The present application is also directed to an electronic device which can be fabricated with low cost and has a thin profile.

One embodiment of the present invention provides a moving module for coupling between a first body and a second body of an electronic device. The moving module includes a rail, a moving element and an elastic element. The rail is disposed on the second body and has a first end, a second end, and at least one curved portion positioned between the first end and the second end. The moving element is in contact with the rail. The elastic element is connected between the moving element and the first body. When the moving element moves along the rail, the first body moves relative to the second body. When the moving element moves from the first end toward the curved portion, a force exerted on the elastic element by the moving element is gradually increased. When the moving element passes the curved portion, an elastic restoration force of the elastic element drives the moving element to move toward the second end. When the moving element reaches the first end or the second end, the first body and the second body interference with each other.

One embodiment of the present invention provides an electronic device including a first body, a second body, and a moving module. The moving module is coupled between the first body and the second body. The moving module includes a rail, a moving element and an elastic element. The rail is disposed on the second body and has a first end, a second end, and at least one curved portion positioned between the first end and the second end. The moving element is in contact with the rail. The elastic element is connected between the moving element and the first body. When the moving element moves along the rail, the first body moves relative to the second body. When the moving element moves from the first end toward the curved portion, a force exerted on the elastic element by the moving element is gradually increased. When the moving element passes the curved portion, the elastic restoration force of an elastic element drives the moving element to move toward the second end. When the moving element reaches the first end or the second end, the first body and the second body interference with each other.

In view of the foregoing, the moving module of the present application has improved commonality and flexibility in fabrication and use thereof. Because the moving module is used in the electronic device, the electronic device can have a thinner profile and can be manufactured with reduced cost.

In order to make the aforementioned and other features and advantages of the present invention more comprehensible, embodiments accompanied with figures are described in detail below.

DESCRIPTION OF THE EMBODIMENTS

Figure 1:
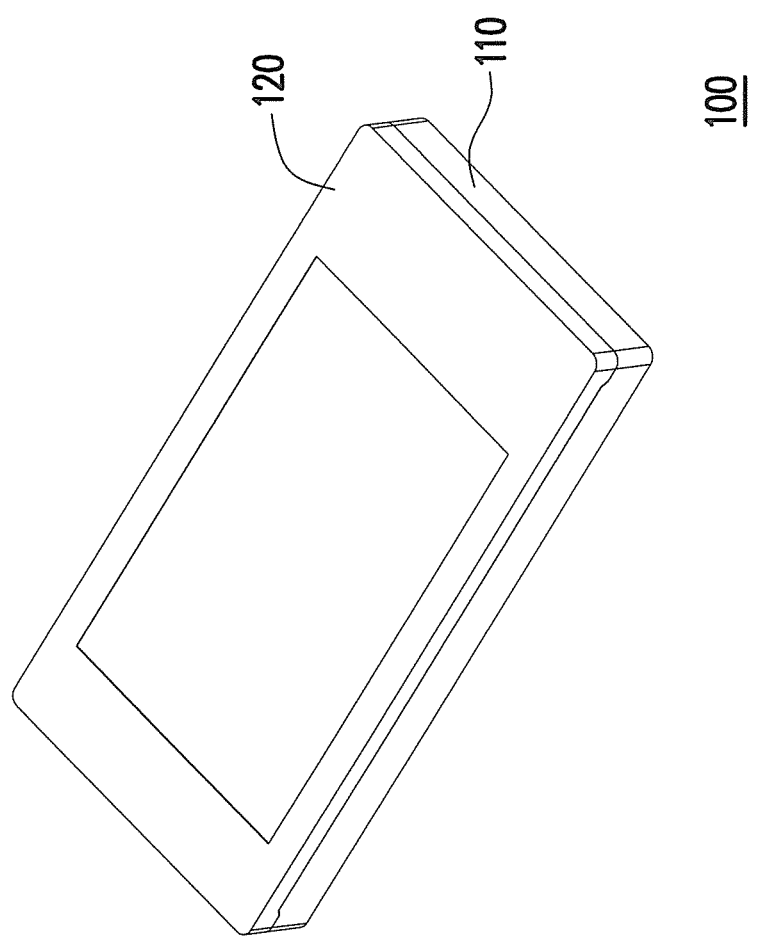
FIG. 1 illustrates an electronic device according to one embodiment of the present invention.
Figure 2:
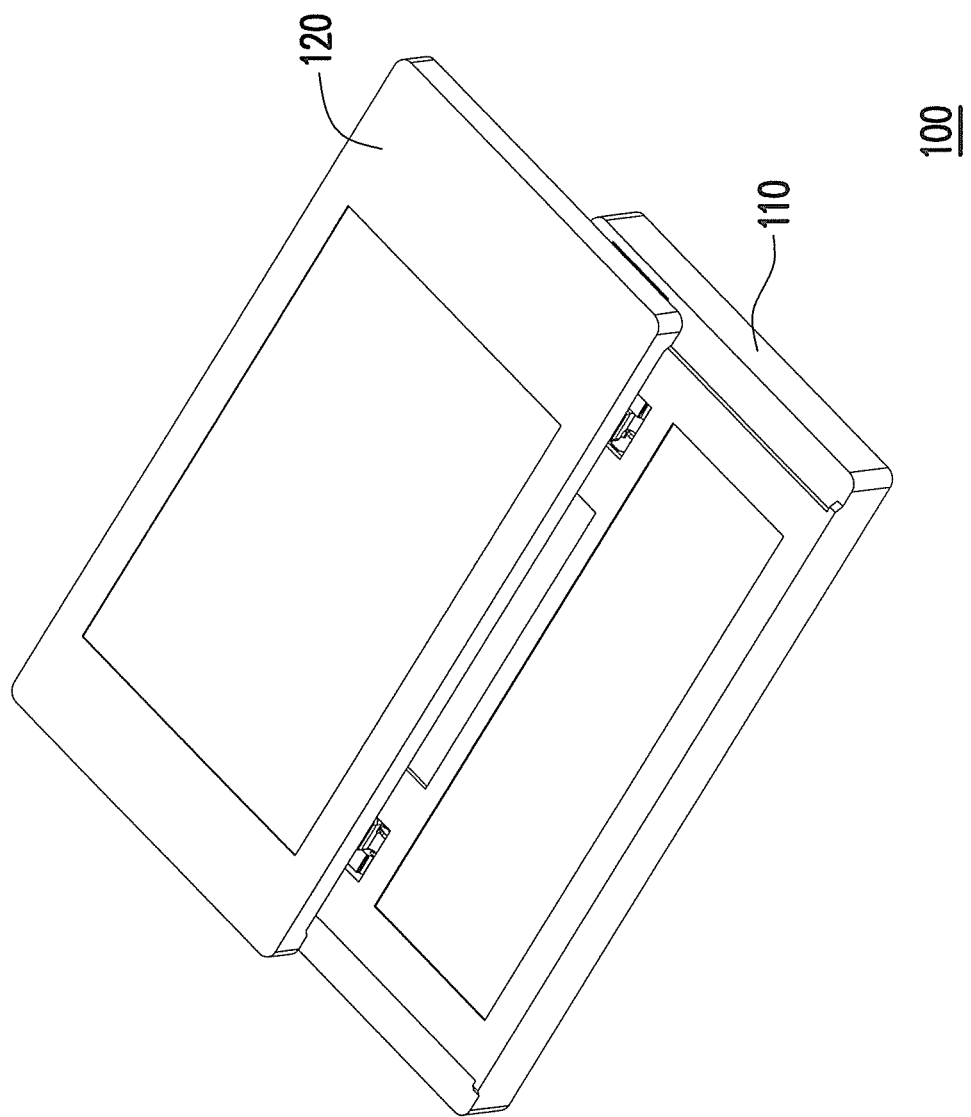
FIG. 2 illustrates the relative movement between a first body and a second body of the electronic device of FIG. 1.

FIG. 1 illustrates an electronic device according to one embodiment of the present invention. FIG. 2 illustrates the relative movement between a first body and a second body of the electronic device of FIG. 1. Referring to FIGS. 1 and 2, the electronic device 100 includes a first body 110, a second body 120, and a moving module 130. The moving module 130 is disposed between the first body 110 and a second body 120 to enable the first body 110 and the second body 120 to move relative to each other via the moving module 130.

In the present embodiment, a display or a touch screen may be disposed on the second body 120 and a standard keyboard may be disposed on the first body 110. When the first body 110 slides away from the second body 120, the standard keyboard can be exposed out of the first body 110.

Figure 3:
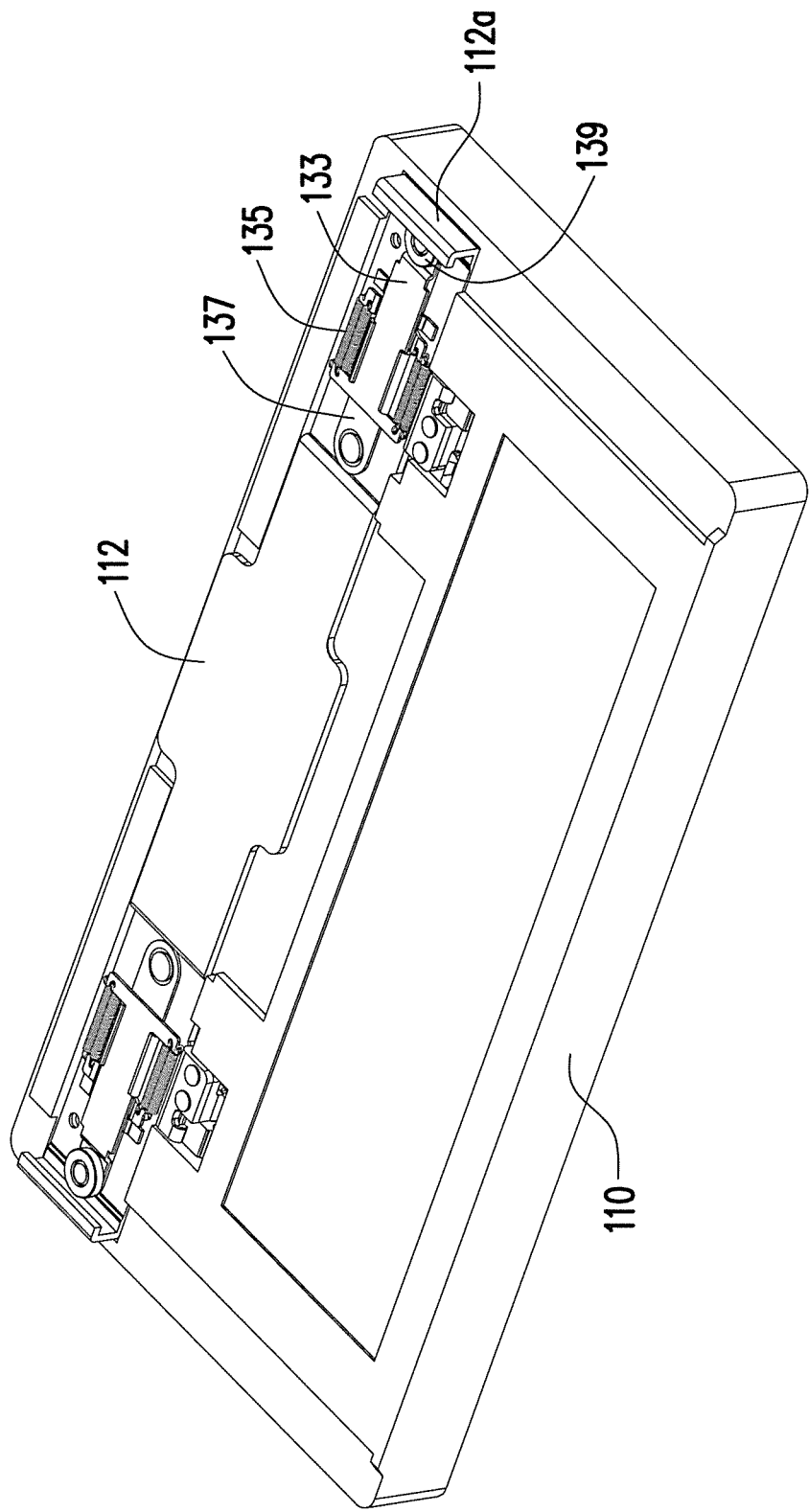
FIG. 3 and FIG. 4 illustrate the second body and the moving module of the electronic device of FIG. 1, viewed from different angles.
Figure 4:
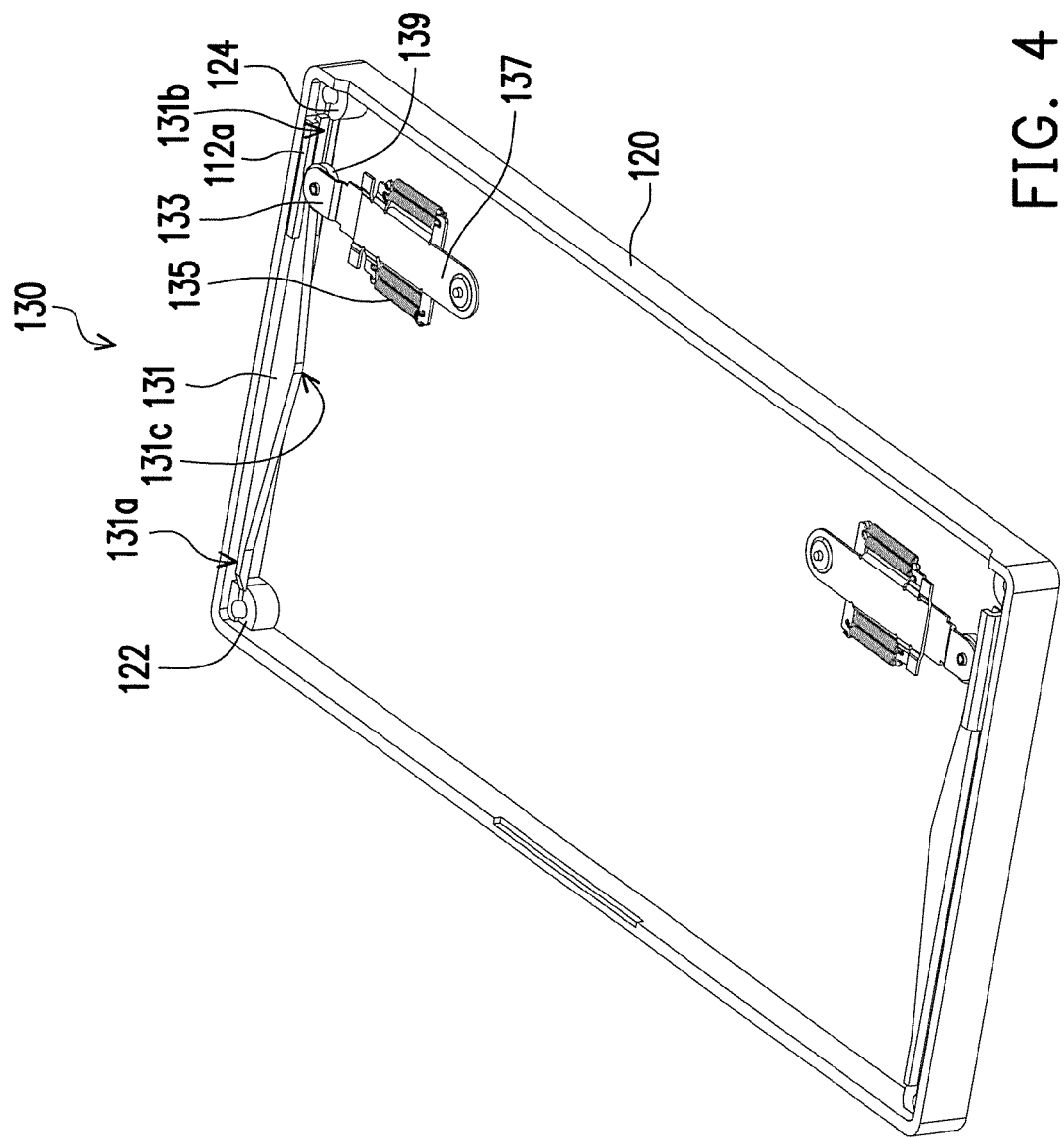

FIG. 3 illustrates part of the components of the electronic device of FIG. 2. FIG. 4 illustrates part of the components of the electronic device of FIG. 1, viewed from a different angle. It is noted that the second body and part of the components of the moving module are not shown in FIG. 4 in order to clearly see the moving elements and rails. Referring to FIGS. 3 and 4, the moving module 130 includes two rails, two moving elements, two fixing elements and two elastic elements. Since these elements are symmetrically disposed in the electronic device 100, the following description is made in relation to only the rail 131, moving element 133, fixing element 137 and elastic element 135. In addition, the present application is not intended to limit the number of the rails, moving elements and elastic elements to any particular embodiments described herein. The rail 131 is disposed on the second body 120. The rail 131 has a first end 131a, a second end 131b, and at least one curved portion 131c positioned between the first end 131a and the second end 131b. The moving element 133 is disposed in contact with the rail 131. The fixing element 137 is fixed to the first body 110, wherein the moving element 133 is slidably disposed on the fixing element 137 and is adapted to slide relatively to the fixing element 137. One end of the elastic element 135 is connected to the moving element 133 and another end of the elastic element 135 is connected to the fixing element 137 fixed to the first body 110.

Referring to FIGS. 1, 2 and 4, when the moving element 133 moves along the rail 131, the first body 110 also moves with respect to the second body 120. When the moving element 133 moves from the first end 131a toward the curved portion 131c, the elastic element 135, 136 is compressed by the moving element 133 and the force exerted on the elastic elements 135, 136 by the moving element 133 is gradually increased under the influence of the shape of the rail 131. After the moving element 133 passes the curved portion 131c, the elastic restoration force of the elastic elements 135, 136 drives the moving element 133 to move toward the second end 131b. It should be noted that, when the moving element 133 reaches the first end 131a or the second end 131b, the first body 110 will interfere with the second body 120 to maintain the electronic device 100 in a closed state shown in FIG. 1 or in an opened state shown in FIG. 2.

In view of the foregoing, in the electronic device 100 of the present embodiment, the elastic element 135 of the moving module 130 is individually disposed between the moving element 133 and the first body 110. In other words, the moving module 130 and various components thereof are separate from the first body 110 and second body 120. As such, when designing the electronic device 100, the designer is able to separately design the moving element 130 and the two bodies 110, 120, thus simplifying the structure of the electronic device 100. This provides improved commonality and flexibility in fabrication and use of the moving module 130, and also makes the electric device 100 lighter and thinner as well as reduces the fabrication cost.

Figure 5:
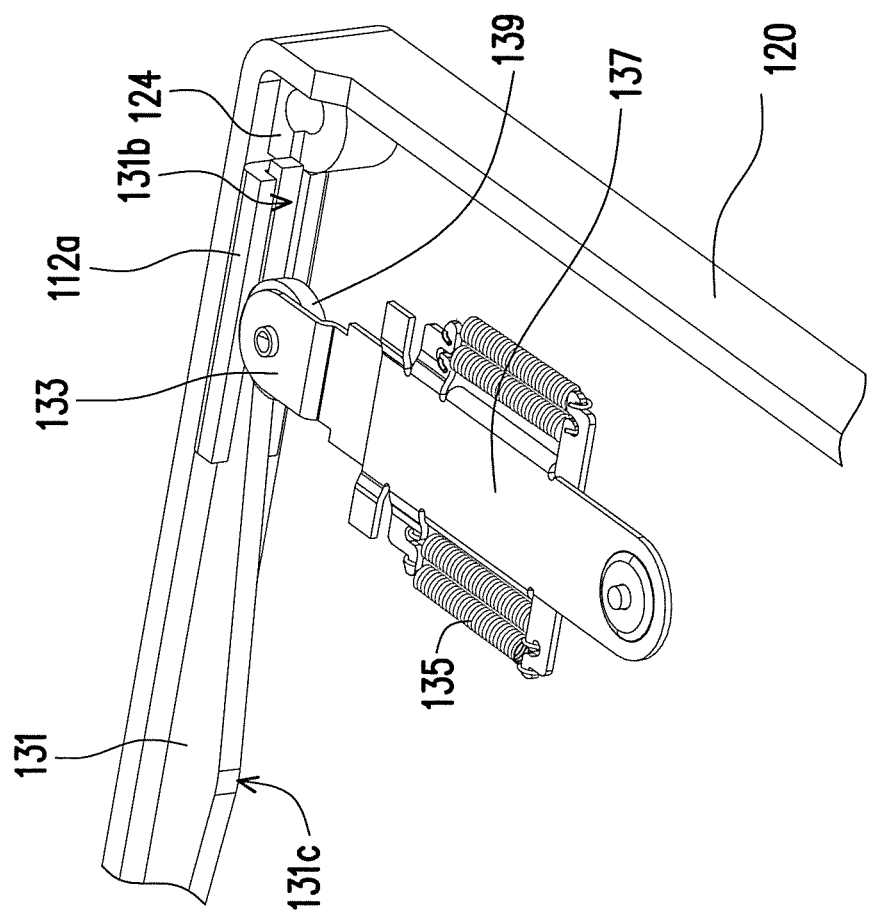
FIG. 5 is a partial enlarged view of the second body and the moving module of FIG. 4.

FIG. 5 is a partial enlarged view of the second body and the moving module of FIG. 4. Referring to FIGS. 3 to 5, the second body 120 has two stop portions 122, 124 positioned adjacent to the first end 131a and the second end 131b, respectively. The first body 110 includes a bracket 112. The fixing element 137 is fixed to the bracket 112, and the elastic element 135 is connected between the moving element 133 and the bracket 112. A slide slot 112a is defined in a side edge of the bracket 112 and the rail 131 is slidably disposed in the slide slot 112a. When the moving element 133 is at the first end 131a, the side edge of the bracket 112 interferences with the stop portion 122. Likewise, when the moving element 133 moves to reach the second end 124, the side edge of the bracket 112 interferences with the stop portion 124. Thus, the first body 110 and the second body 120 can be maintained in the closed state shown in FIG. 1 and the opened state shown in FIG. 2.

In the present embodiment, the moving module 130 is further provided with a roller 139. The roller 139 is rotatably disposed on the moving element 133 and is in contact with the rail 131. The rolling of the roller 139 on the rail 131 results in a smaller friction when the moving element 133 slides on the rail 131.

In addition, the present embodiment is not intended to impose any limitation on the shape and path of the rail 131 and the number of the curved portion 131c. In order to enable multi operation modes of the electronic device 100, the shape and path of the rail 131 can be modified such that the first body 110 and the second body 120 of the electronic device 100 slide on different sections of the path at different speeds. For example, in another embodiment not illustrated, an offset distance of the curved portion from the first end and the second end of the rail is larger than that offset distance with respect to the rail 131 as described in the above embodiment. As such, when the moving element moves along the rail, the force exerted on the elastic element by the moving element becomes larger accordingly. This can give the user a more apparent operational feeling when the first body and the second body slide relative to each other.

As shown in FIGS. 3 to 5, in the present embodiment, the moving element 133 is slidably disposed on the fixing element fixed to the bracket 112 of the first body 110 and is connected to the elastic elements 135, 136. When the moving element 133 moves from the first end 131a toward the curved portion 131c, the moving element 133 slides relative to the first body 110 and gradually stretches the elastic elements 135, 136 with the changing of the shape of the rail 131. It is noted, however, that the present application is not intended to limit the elastic deformation of the elastic elements 135, 136 in any form as described herein.

Figure 6:
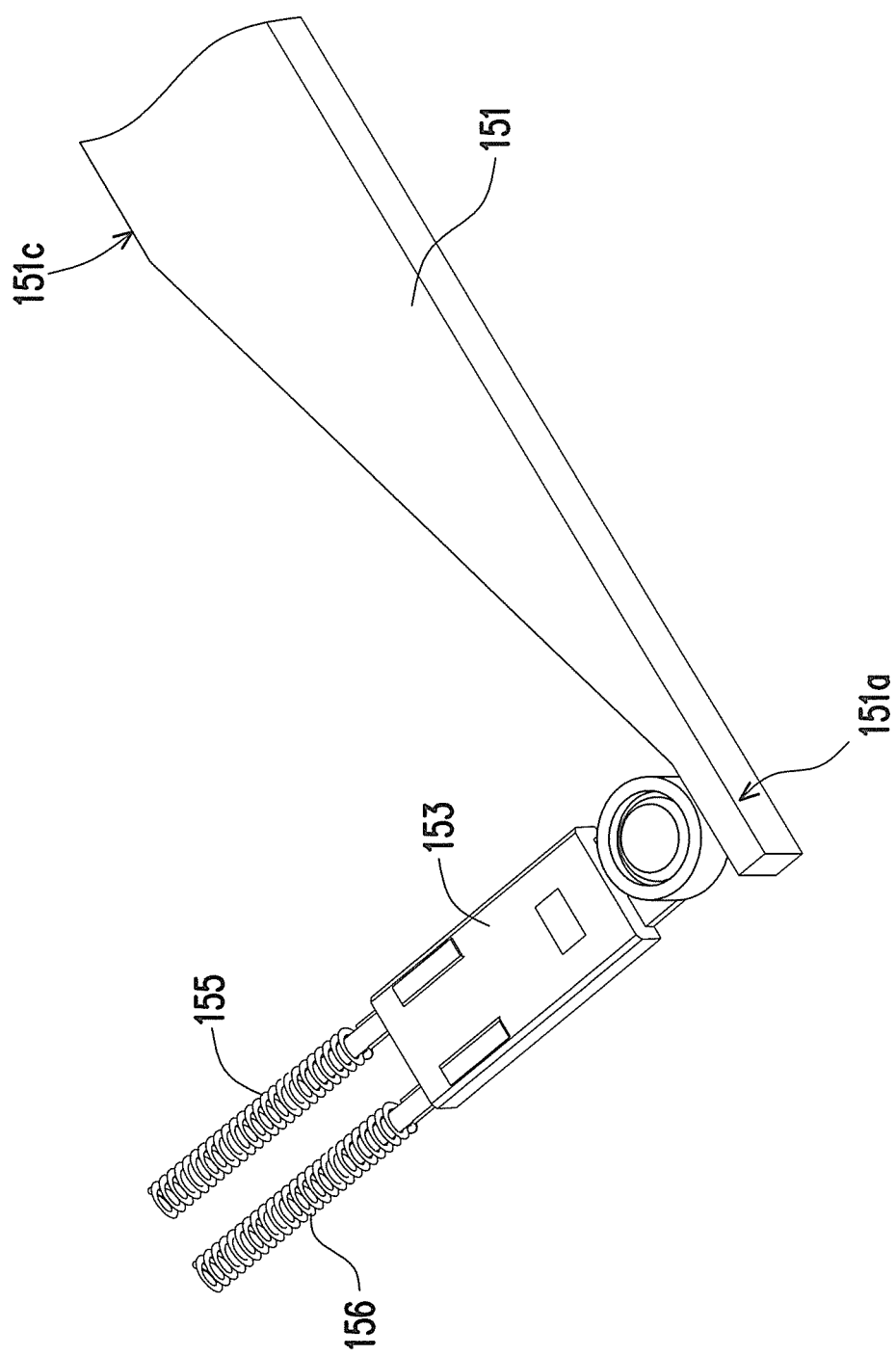
FIG. 6 is a partial view of an electronic device according to another embodiment of the present invention.

FIG. 6 is a partial view of an electronic device according to another embodiment of the present invention. Referring to FIG. 6, different than the embodiment described above, the moving element 1153 is connected to the first body (not shown) via the two elastic elements 155, 156. When the moving element 153 moves from the first end 151a of the rail 151 toward the curved portion 151c, the moving element 153 slides relative to the first body and compresses the elastic elements 155, 156. This can likewise achieve the same moving result as in the previous embodiment.

In summary, in the electronic device of the present application, the first body and the second body can slide relative to each other via the moving module that is separate from the two bodies. The moving module can also maintain the first body and the second body in the closed state and opened state. This therefore enables the user to readily change the driving mode of the electronic device by modifying the rail and elastic element, which provides improved commonality and flexibility in fabrication and use of the moving module and the electronic device. In addition, the fabrication cost of the electronic device can be reduced because of the simple structure and mass production feasibility of the moving module.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A moving module for coupling between a first body and a second body of an electronic device wherein the first body comprises a bracket, the moving module, comprising:
    a rail disposed on one side of the second body and having a first end, a second end, and at least one curved portion positioned between the first end and the second end;
    a moving element in contact with the rail; and
    an elastic element, wherein one end of the elastic element is connected to the moving element and another end of the elastic element is connected to the bracket;
    wherein, when the moving element moves along the rail, the first body moves relative to the second body, when the moving element moves from the first end toward the curved portion, a force exerted on the elastic element by the moving element is gradually increased, when the moving element passes the curved portion, an elastic restoration force of the elastic element drives the moving element to move toward the second end, the second body has two stop portions positioned adjacent to the first end and the second end respectively, a through groove exists between the rail and the second body, the bracket comprises a slide slot located at a side edge of the bracket and located in the through groove such that the rail is slidably disposed in the slide slot, when the moving element reaches the first end, the side edge of the bracket interferences with one of the stop portions, when the moving element reaches the second end, the side edge of the bracket interferences with the other of the stop portions.

2. The moving module according to claim 1, wherein the moving element is slidably disposed on the bracket of the first body and is connected to the elastic element, when the moving element moves from the first end toward the curved portion, the moving element slides relative to the second body and compresses the elastic element.

3. The moving module according to claim 2, further comprising a roller disposed on the moving element and in contact with the rail.

4. The moving module according to claim 1, wherein the moving element is slidably disposed on the first body and is connected to the elastic element, when the moving element moves from the first end toward the curved portion, the moving element slides relative to the second body and stretches the elastic element.

5. The moving module according to claim 4, further comprising a roller disposed on the moving element and in contact with the rail.

6. An electronic device comprising:
    a first body, comprises a bracket;
    a second body; and
    a moving module coupled between the first body and the second body, the moving module comprising:
        a rail disposed on the second body and having a first end, a second end, and at least one curved portion positioned between the first end and the second end;
        a moving element in contact with the rail; and
        an elastic element, wherein one end of the elastic element is connected to the moving element and another end of the elastic element is connected to the bracket;
    wherein, when the moving element moves along the rail, the first body moves relative to the second body, when the moving element moves from the first end toward the curved portion, a force exerted on the elastic element by the moving element is gradually increased, when the moving element passes the curved portion, an elastic restoration force of the elastic element drives the moving element to move toward the second end, the second body has two stop portions positioned adjacent to the first end and the second end, respectively, a through groove exists between the rail and the second body, the bracket comprises a slide slot located at a side edge of the bracket and located in the through groove such that the rail is slidably disposed in the slide slot, when the moving element reaches the first end, the side edge of the bracket interferences with one of the stop portions, when the moving element reaches the second end, the side edge of the bracket interferences with the other of the stop portions.

7. The electronic device according to claim 6, wherein the moving element is slidably disposed on the bracket of the first body and is connected to the elastic element, when the moving element moves from the first end toward the curved portion, the moving element slides relative to the second body and compresses the elastic element.

8. The electronic device according to claim 7, further comprising a roller disposed on the moving element and in contact with the rail.

9. The electronic device according to claim 6, wherein the moving element is slidably disposed on the first body and is connected to the elastic element, when the moving element moves from the first end toward the curved portion, the moving element slides relative to the second body and stretches the elastic element.

10. The electronic device according to claim 9, further comprising a roller disposed on the moving element and in contact with the rail.

* * * * *